(12) United States Patent
Kapoor et al.

(10) Patent No.: US 10,614,091 B1
(45) Date of Patent: Apr. 7, 2020

(54) WAREHOUSE BASED REPORTING AND OPERATIONAL REPORTING INTEGRATION

(71) Applicant: Numerify, Inc., Cupertino, CA (US)

(72) Inventors: Rahul Kapoor, Sunnyvale, CA (US); Gaurav Rewari, Cupertino, CA (US); Aravind Sridharan, San Jose, CA (US); Sadanand Sahasrabudhe, Rockville, MD (US); Florian Schouten, Wayland, MA (US)

(73) Assignee: Numerify, Inc., San Jose, CA (US)

( * ) Notice: Subject to any disclaimer, the term of this patent is extended or adjusted under 35 U.S.C. 154(b) by 657 days.

(21) Appl. No.: 15/279,839

(22) Filed: Sep. 29, 2016

(51) Int. Cl.
*G06F 16/20* (2019.01)
*G06F 16/25* (2019.01)
*G06F 16/28* (2019.01)

(52) U.S. Cl.
CPC .......... *G06F 16/254* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 6,493,695 B1 * | 12/2002 | Pickering | H04M 3/5183 706/45 |
| 2005/0283642 A1 * | 12/2005 | Dill | G06Q 10/06 714/4.1 |
| 2007/0112876 A1 * | 5/2007 | Blaisdell | G06F 16/254 |
| 2013/0191185 A1 * | 7/2013 | Galvin | G06Q 10/10 705/7.37 |
| 2015/0347705 A1 * | 12/2015 | Simon | G16H 50/30 705/3 |
| 2016/0156367 A1 * | 6/2016 | Kalevo | H03M 7/3055 375/240 |

* cited by examiner

*Primary Examiner* — Jau Shya Meng
(74) *Attorney, Agent, or Firm* — Rahman LLC

(57) ABSTRACT

Approaches for integrating an operational reporting system with a warehouse based reporting system. The operational reporting system and the warehouse based reporting system may be offered and supported by different vendors, and so may be deployed in different clouds or as separate product installations in case of on-premise software, or these systems may be offered and supported by a single vendor, and so may be deployed in the same cloud or as part of a common product installation in case of on-premise software. The integrated system uses a common or consistent dimensional model to link related measures of the operational reporting system and the warehouse based reporting system, which allows for analysis of real time content with historical and cross subject perspective provided alongside in the same interface. The integration also facilitates trend analysis and predictive analytics in real time.

10 Claims, 12 Drawing Sheets

WAREHOUSE BASED REPORTING AND OPERATIONAL REPORTING INTEGRATION

TECHNICAL FIELD

Embodiments herein generally relate to a warehouse based reporting system and an operational reporting system, and more specifically to approaches for integrating a warehouse based reporting system with an operational reporting system using a common dimensional model.

BACKGROUND

Application software products in areas like Customer Relationship Management (CRM), Enterprise Resource Planning (ERP), and Human Resource (HR) & Information Technology Service Management (ITSM) typically include inbuilt reporting & analytics capabilities. This has also been historically true for on-premise applications and for newer cloud applications. These inbuilt reporting capabilities fall in the areas of operational reporting and key performance indicator (KPI) reporting, whereas business intelligence (BI) and predictive analytics use cases are typically addressed by extraction of data into a separate analytics/data warehouse environment. Operational reporting may be based on an abstracted semantic model or may be conducted through the construction of queries directly against Online Transaction Processing (OLTP) tables. Key performance indicators (KPI) provide trending capabilities by creating snapshots of the Online Transaction Processing (OLTP) database for the key performance indicators (KPI) and a limited number of dimensions. The key performance indicators (KPI) are defined by a formula that is executed on a schedule to provide a daily history of key performance indicator (KPI) values qualified by the relevant dimensions. The key performance indicators (KPI) and dimension values are part of reports/dashboards and typically stored in a single table within the same operational database instance.

A Business Intelligence (BI) use case typically involves the creation of an atomic data warehouse with a large number of facts and dimensions and a semantic model layer of abstraction. Based on the facts, metrics, and dimensions that are pre-computed, ad hoc analysis is performed and new questions are answered in a highly efficient way. The typically Business Intelligence (BI) use case is addressed through the extraction, transformation, and loading of data using Extract Transform Load (ETL) tools into a data warehouse designed to meet specific reporting & analysis needs.

Users have struggled with the co-existence of Business Intelligence (BI), operational reporting, and key performance indicator (KPI) reporting products within the same deployment. Data conformance between operational reporting and data warehouse based reports may be problematic, and these tools often have very different user interfaces creating a confusing experience for the user. In the on-premise applications, the key performance indicator (KPI) reporting tools have often been retired once a company adopts a data warehouse based Business Intelligence (BI) solution since the BI solution provides a superset of capabilities, particularly as application vendors have purchased Business Intelligence (BI) tools (e.g. SAP with Business Objects, Oracle with Siebel Analytics, etc.). However, the coexistence challenge remains with operational reporting and Business Intelligence (BI) solutions.

A few existing systems have addressed coexistence challenge through investments in real time data warehouse capabilities, but those have been the exception rather than the rule given the cost and complexity of implementation. The coexistence challenge is even more dire when cloud applications are introduced into consideration as cloud application vendors generally do not have Business Intelligence (BI) tools or solutions. The adoption of cloud application vendors snapshotting based key performance indicator (KPI) trending tools is larger, so when they do embark on Business Intelligence (BI) solutions they confront coexistence challenges not just with the operational reporting tools but also with KPI reporting tools.

FIG. 1 illustrates a conventional warehouse based reporting system according to the prior art. The conventional warehouse based reporting system includes one or more warehouse sources 102A-N, a raw extract store 104, a staging store 106, a data warehouse 108, a result cache 110, a collection of reports and dashboards 112, and a dimensional model 114 used for describing the warehouse data with mappings to the source model. The one or more warehouse sources 102A-N provide data that needs to be analyzed. The data from one or more warehouse sources 102A-N is initially extracted and stored in the raw extract store 104. The staging store 106 is where most of the transformations like source data change identification, surrogate key generation, surrogate key replacement, and data quality correction are performed on data obtained from the raw extract store 104. The staging store 106 is connected to the data warehouse 108, which houses the data in a form which is amenable for analytics, e.g. a star schema. The process of extracting data from the one or more warehouse sources 102A-N, transforming the data, and loading the data all the way to the data warehouse 108 in a form that meets the specific reporting and analysis needs is performed using Extract Transform Load (ETL) tools.

Data warehouse 108 transfers the data to the result cache 110. Result cache 110 is an area of memory that stores the warehouse related data in query blocks such that the query blocks may be reusable. The definition of facts, measures, and dimensions for an analytical application is captured in s dimensional model 114 that is queried by the reports and dashboards 112. Dimensional model 114 is related to source models by mappings so that the source data can be transformed to a schema described by the dimensional model 114, which is typically a star schema.

FIG. 2 illustrates a conventional operational reporting system according to the prior art. The conventional operational reporting (OR) system of FIG. 2 includes an OR source 202, simple transformations 204, a result cache 206, a collection of reports and dashboards 208, and a simple source based data model 210. Operational reporting (OR) source 202 provides operational reporting related data which then goes through simple transformations 204 typically meant to map data in a source schema to data structured in a schema amenable for analytics. Result cache 206 stores the operational system related data in query blocks such that the query blocks may be reusable. The reports and dashboards 208 query the source based on the simple source based data model 210.

Data warehouses (e.g. data warehouse 108) typically refresh their stored data once or twice a day while Operational Reporting systems access live data. Supporting near real time data access with warehouse infrastructure is possible by making the Extract Transform Load (ETL) pipeline faster so that the process completes under a specified near real time latency threshold (e.g. 30 minutes) for the tables required for Operational Reporting. As only a subset of warehouse tables are needed for operational reporting, and hence need to be updated in near real time, it is quite possible to complete the ETL for those within the acceptable latency window. Note though that logically related group of tables need to be updated together to avoid any inconsistencies with selective update of tables.

For real time data access, it may not be possible to complete the Extract Transform Load (ETL) within the acceptable latency window even for a small subset of tables, hence an alternate strategy is needed. The alternate strategy may require bypassing certain expensive Extract Transform Load (ETL) steps like data quality correction and surrogate key generation/replacement. Capturing data changes in real time may be possible by very frequently polling for changed data using traditional API (e.g. ODBC or JDBC) based extractors typically used in ETL systems. A different data gathering strategy may also be employed in which changes are captured at the source in real time by effectively intercepting every data modification statement issued to the source's data store.

For warehouse based reports and operational reports to be comparable, the underlying data models need to be consistent or comparable. The approach of sharing the dimensional model 114 between the warehouse based reporting system and the operational reporting system requires an extra processing step in the operational reporting system to map from the OR source 202 to a dimensional model of the warehouse based reporting system in real or near real time. If this step is skipped for performance reasons in the operational reporting system and source tables are directly queried, an application developer discipline is applied to ensure the same wording for measures, facts, and dimensions in the two systems mean the same thing because they are computed in the same way from the source elements.

Even if the model definitions of the warehouse based reporting system and the operational reporting system are the same and the same data is being extracted for the same measures in the operational reporting system and warehouse based reporting system, data discrepancies are still possible in the two systems as data in the operational reporting system and warehouse based reporting system is fetched at different frequencies and data in the warehouse systems goes through additional transforms. The drawback of fetching data at different frequencies is that the value of measures (e.g. the number of active incidents) in the operational system is unlikely to match that in the warehouse system because recent source data changes may have been picked up by the operational reporting system but not by the warehouse based reporting system.

SUMMARY

Accordingly, there remains a need in the art for approaches for integrating an operational reporting system with a warehouse based reporting system for analysis, wherein the analysis in the two systems (i.e. the operational reporting system and the warehouse based reporting system) may be related and any data discrepancies dealt with regardless if there are two separate vendors involved with one owning the source and operational reporting solution and the other owning the warehouse based reporting solution or one vendor providing both solutions. For the one vendor case, the approach should cover both scenarios where the warehouse based reporting and operational reporting systems share a common warehousing style data processing infrastructure or use different data processing tools and infrastructure for the warehouse ETL pipeline and Operational Reporting real time pipeline.

Advantageously, embodiments of the invention discussed herein provide for automatically integrating an operational reporting system and a warehouse based reporting system that are supported by two different vendors using a common dimensional model and separate data processing infrastructure. An embodiment may perform: (i) querying the operational reporting system for model and mapping information extraction; (ii) automatically enforcing consistency between a data model of the operational reporting system and a dimensional data model of the warehouse based reporting system by aligning the dimensional data model of the warehouse based reporting system with the data model of the operational reporting system using software aids; (iii) automatically ensuring consistency of extraction methods, timestamping, timezones and collations across the operational reporting system and the warehouse based reporting system when populating data per a common or consistent dimensional model; (iv) automatically analyzing real time content provided by the operational reporting system with historical content and cross subject perspective provided by the warehouse based reporting system, and (v) automatically enabling predictions for real time content based on the common or consistent dimensional model that links the real time content of the operational reporting system with historical content and predictive models of the warehouse based reporting system.

An embodiment of the invention may also perform: (vi) automatic detection of one or more data discrepancies between same metrics in the operational reporting system and the warehouse based reporting system due to (a) different data refresh times of the operational reporting system and the warehouse based reporting system, and (b) skipping data quality correction of the operational reporting system for efficiency, (vii) automatic elimination of the data discrepancies caused due to data staleness by identifying tables, including any logically connected tables, based on which the metrics are computed and selectively refreshing the logical group of connected tables using code generated incremental refresh jobs; and (viii) automatic elimination of data discrepancies caused due to skipped data quality transforms by incorporating the data quality transforms for the operational reporting system.

In another embodiment, the embodiment may perform: (viii) automatic identification of relevant trends from the data discrepancies by comparing metric values of the operational reporting system with current and historical values of the same metrics in the warehouse based reporting system and (ix) automatic generation of alerts when the data discrepancies exceed a predefined value, or an auto identified threshold value. This embodiment may display the relevant trends using standard business intelligence charts.

In another embodiment, the embodiment may automatically integrate a warehouse based reporting system and an operational reporting system that is supported by a warehouse vendor using a common dimensional data model, and common data processing infrastructure for the operational reporting system and the warehouse based reporting system. This embodiment may perform: (i) automatically ensuring that modified jobs are generated for near real time data access and real time data access for a subset of warehouse tables while (a) ensuring logically related group of warehouse tables are updated together to avoid any inconsistencies with selective updating and (b) tracking dropped transforms which may cause potential data discrepancies; (ii) automatically capturing source data changes in real time for the operational reporting system; (iii) automatically analyzing real time content provided by the operational reporting system with historical content and cross subject perspective provided by the warehouse based reporting system; (iv) automatically enabling predictions for the real time content based on a common or consistent dimensional model that links the real time content of the operational reporting system with historical content and predictive models of the warehouse based reporting system; (v) automatically detecting one or more data discrepancies between the operational reporting system and the warehouse based reporting system due to (a) different data refresh times of the operational reporting system and the warehouse based reporting system, and (b) skipping data quality correction of the operational reporting system for efficiency; (vi) automatically identifying relevant trends from the data discrepancies by comparing metric values of the operational reporting system with current and historical values of the same metrics in the warehouse based reporting system; (vii) automatically generating alerts when the data discrepancies exceed a predefined value, or an auto identified threshold value; (viii) automatically eliminating the data discrepancies caused due to data staleness by identifying tables, including logically connected tables if any, based on which the metrics are computed and selectively refreshing the logical group of connected tables, using code generated incremental refresh jobs; and (ix) automatically eliminating data discrepancies due to skipped data quality transforms by incorporating the data quality transforms for the operational reporting system.

In yet another aspect, an embodiment may automatically integrate a warehouse based reporting system and an operational reporting system that is supported by a warehouse vendor using a common dimensional data model and separate data processing infrastructure for the operational reporting system and the warehouse based reporting system. The embodiment may perform: (i) automatically ensuring that modified jobs are generated for near real time data access and real time data access for a subset of warehouse tables while (a) ensuring logically related group of warehouse tables are updated together to avoid any inconsistencies with selective updating and (b) tracking dropped transforms which may cause potential data discrepancies; (ii) automatically ensuring consistency of extraction methods, timestamping, timezones and collations across the operational reporting system and the warehouse based reporting system when populating data per a common or consistent dimensional model; (iii) automatically capturing source data changes in real time for the operational reporting system; (iv) automatically analyzing real time content provided by the operational reporting system with historical content and cross subject perspective provided by the warehouse based reporting system; (v) automatically enabling predictions for the real time content based on a common or consistent dimensional model that links the real time content of the operational reporting system with historical content and predictive models of the warehouse based reporting system; (vi) automatically detecting one or more data discrepancies between the operational reporting system and the warehouse based reporting system due to (a) different data refresh times of the operational reporting system and the warehouse based reporting system, and (b) skipping data quality correction of the operational reporting system for efficiency; (vii) automatically identifying relevant trends from the data discrepancies by comparing metric values of the operational reporting system with current and historical values of the same metrics in the warehouse based reporting system; (viii) automatically generating alerts when the data discrepancies exceed a predefined value, or an auto identified threshold value; (ix) automatically eliminating the data discrepancies caused due to data staleness by identifying tables, including logically connected tables if any, based on which the metrics are computed and selectively refreshing the logical group of connected tables, using code generated incremental refresh jobs; and (x) automatically eliminating data discrepancies due to skipped data quality transforms by incorporating the data quality transforms for the operational reporting system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
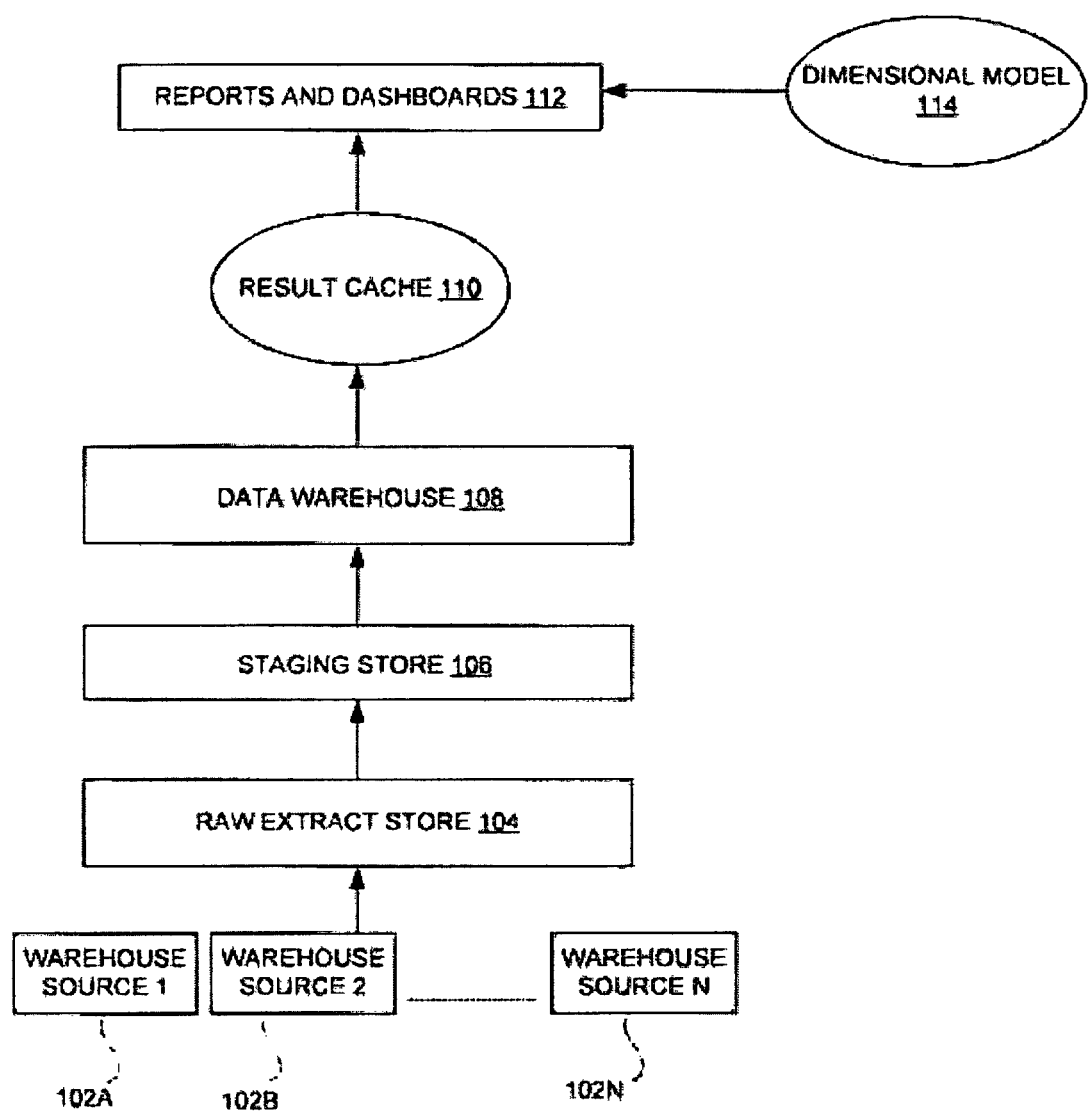
FIG. 1 illustrates a conventional warehouse based reporting system according to the prior art.
Figure 2:
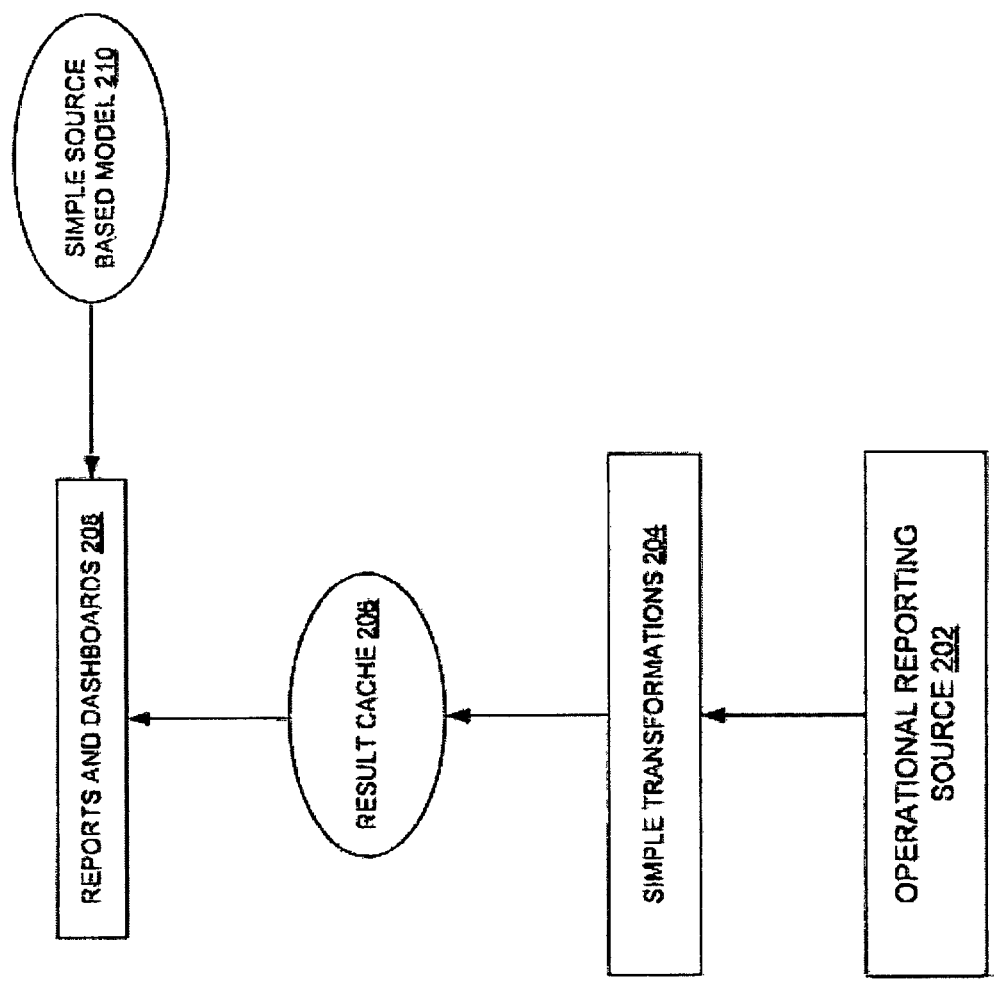
FIG. 2 illustrates a conventional operational reporting system according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide for integrating an operational reporting system with a warehouse based reporting system. Referring now to the drawings, and more particularly to FIGS. 3 through 12, similar reference characters denote corresponding features consistently throughout the figures.

Extraction method refers to a method used for fetching of data from a database or data source underlying an operational reporting system or a warehouse based reporting system. Timestamp, in the context of data, refers to a date and a time of updating data in a database of the operational reporting system or the warehouse based reporting system. Timezone, in the context of data, refers to time zone information associated with the operational reporting system or the warehouse based reporting system data elements. Collation, in the context of databases, refers to an algorithm for defining the order of comparing two given character strings and deciding which should come before the other.

Data model refers to an abstract model that organizes elements of data and standardizes how they relate to one another and to properties of the real world entities. In the context of databases, data models are specified by database schemas and associated metadata defining properties of and relationships between schema elements. Dimensional model refers to data models used in data warehouse design and typically includes the concepts of facts (measures), and dimensions (context). Facts are typically numeric values that can be aggregated, and dimensions are groups of hierarchies and descriptors that define the facts. For example, sales amount is a fact; timestamp, product, register #, store #, etc. are elements of dimensions. Metrics, in the context of data analytics, refer to expressions based on facts (e.g. total revenue or sales) associated with the operational reporting system or the warehouse based reporting system. Lineage, in the context of data models or dimensional models, refers to the data ancestry or definition of data model elements in terms of data source elements. In a typical dimensional model, there may be multiple level of mappings that transform the data source elements to the dimensional model elements via expressions and lineage provides entire source to model transformation sequence. For example, A may be defined as Sum(X,Y), B as Square(A) and C as Mult(B,Z), then the lineage of C would be Mult(B=Square(A=Sum(X, Y)), Z) that shows how C was derived from source elements X, Y & Z through a multi-step mapping.

Predictive models are statistical models created by analyzing historical data to enable predictions. Based on the values of a set of predictor variables, the predictive model generates a predicted value for a target variable. Modern data warehouses typically include multiple predictive models for enabling a variety of predictions. Data warehouses may be created for multiple subject areas like Sales, Marketing, HR, Finance and IT and analytical reports may provide cross subject perspective across an organizations departments. For organizations with both warehouses and operational reporting stores (either in-house, at the same cloud based vendor or at different cloud based vendors), to be able to perform analytics spanning the different datastores, the stores need to have a common dimensional model, or at least models which are "consistent" or "aligned" where similar entities (like facts and associated metrics or dimensions) are defined the same way even though they may not have the exact same names.

Data refresh time refers to a time at which the ETL (Extract Transform Load) jobs are executed to selectively/incrementally refresh data associated with the operational reporting system or the warehouse based reporting system. Database refreshing is a process by which a database (e.g. the database of the warehouse based reporting system) is updated over a period of time to be in sync with changes at the data sources used for populating the database. Data staleness refers to some or all parts of the database not being in sync with the changes at the data source. Recent data in warehouses can be stale compared to the data source as the ETL jobs to refresh the data warehouses are run only on a scheduled basis (e.g. once a day) and not constantly. Real time content refers to content generated based on live data as rendered in operational reports. Historical content refers to content generated based on historical data typically from a data warehouse as rendered in data warehouse based reports.

Data quality refers to a condition of a set of values of qualitative or quantitative variables. Data quality correction refers to a process of correcting defects or ambiguity in the data after the detection of data values that do not meet the data rules. Skipping data quality correction is a process of skipping or eliminating the data quality correction of the data associated with a system (e.g. the operational reporting system) done for performance reasons as it is a computationally expensive process.

The above definitions are known to a person having ordinary skill in the art.

Figure 3:
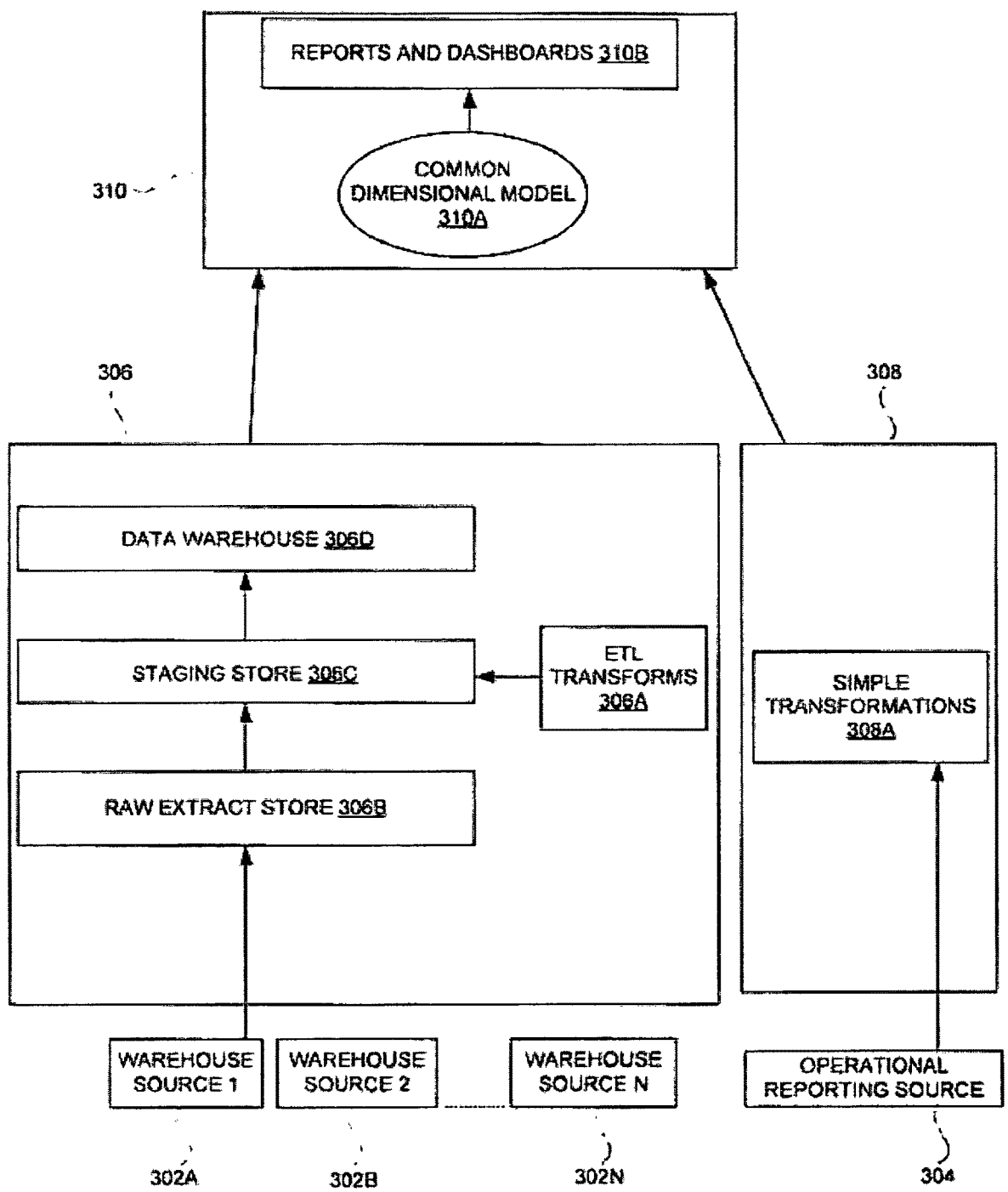
FIG. 3 illustrates an integrated system that integrates a warehouse based reporting system with an operational reporting system according to an embodiment of the invention.

FIG. 3 illustrates an integrated system 310 that integrates a warehouse based reporting system 306 with an operational reporting system 308 according to an embodiment of the invention. Warehouse based reporting system 306 includes an Extract Transform Load (ETL) transforms 306A, a raw extract store 306B, a staging store 306C, and a data warehouse 306D. Operational reporting system 308 includes simple transformations 308A. Integrated system 310 includes a common dimensional model 310A and a collection of reports and dashboards 310B and several other modules required to make the integration work as expanded in FIG. 4.

In an embodiment, warehouse based reporting system 306 receives data that needs to analyzed from the one or more warehouse sources 302A-N. Data stored in one or more warehouse sources 302A-N is initially extracted and transferred to raw extract store 306B. The staging store 306C is where most of the transformations like source data change identification, surrogate key generation, surrogate key replacement, and data quality correction are performed on the data from the raw extract store 306B. The staging store 306C is connected to the data warehouse 306D, which houses the data in a form which is amenable for analytics, e.g. a star schema. The process of extracting data from the one or more warehouse sources 302A-N, transforming the data, and loading the data all the way to the data warehouse 306D in a form that meets the specific reporting and analysis needs is performed using Extract Transform Load (ETL) transforms 306A. The data in the data warehouse 306D is described by and queried using the common dimensional model 310A of the integrated system 310. Similarly, operational reporting system 308 receives operational reporting related data from an operational reporting (OR) source 304. The data related to operational reporting are subjected to simple transformations 308A to map data in a source schema to data structured in a schema amenable for analytics. Operational reporting system 308's data is also described by and queried using the common dimensional model 310A of integrated system 310. The definitions of facts, measures, and dimensions of operational reporting system 308 and warehouse based reporting system 306 for analytics are captured in the common dimensional model 310A that may be queried by the reports and dashboards 310B.

In an embodiment, linking of related measures in the operational reporting system 308 and the warehouse based reporting system 306 is facilitated by the use of the common dimensional model 310A that allows for analysis of real time content with historical and cross subject perspective provided alongside in the same interface along with the ability to do ad-hoc analysis. Analytics in the operational reporting system 308 and the warehouse based reporting system 306 is relatable by introducing an early step in the mappings which converts the source schema into a source independent schema. Even if some of the subsequent steps of the mapping are skipped for efficiency, the common dimensional model 310A is still schema comparable.

In another embodiment, data discrepancies are corrected by selective refresh of a logical group of connected tables in an automated fashion using code generated Extract Transform Load (ETL) jobs and incremental refresh for efficiency. Data discrepancies may be leveraged by identifying patterns and trends in real time so that appropriate action may be taken on them. For example, if there is a sudden increase in the number of incoming active incidents, the number of active incidents may be much higher in the operational reporting system 308 than in the warehouse based reporting system 306. Based on automated detection of significant changes to measures in real time over historical values, alerts may be generated proactively in real time.

Figure 4:
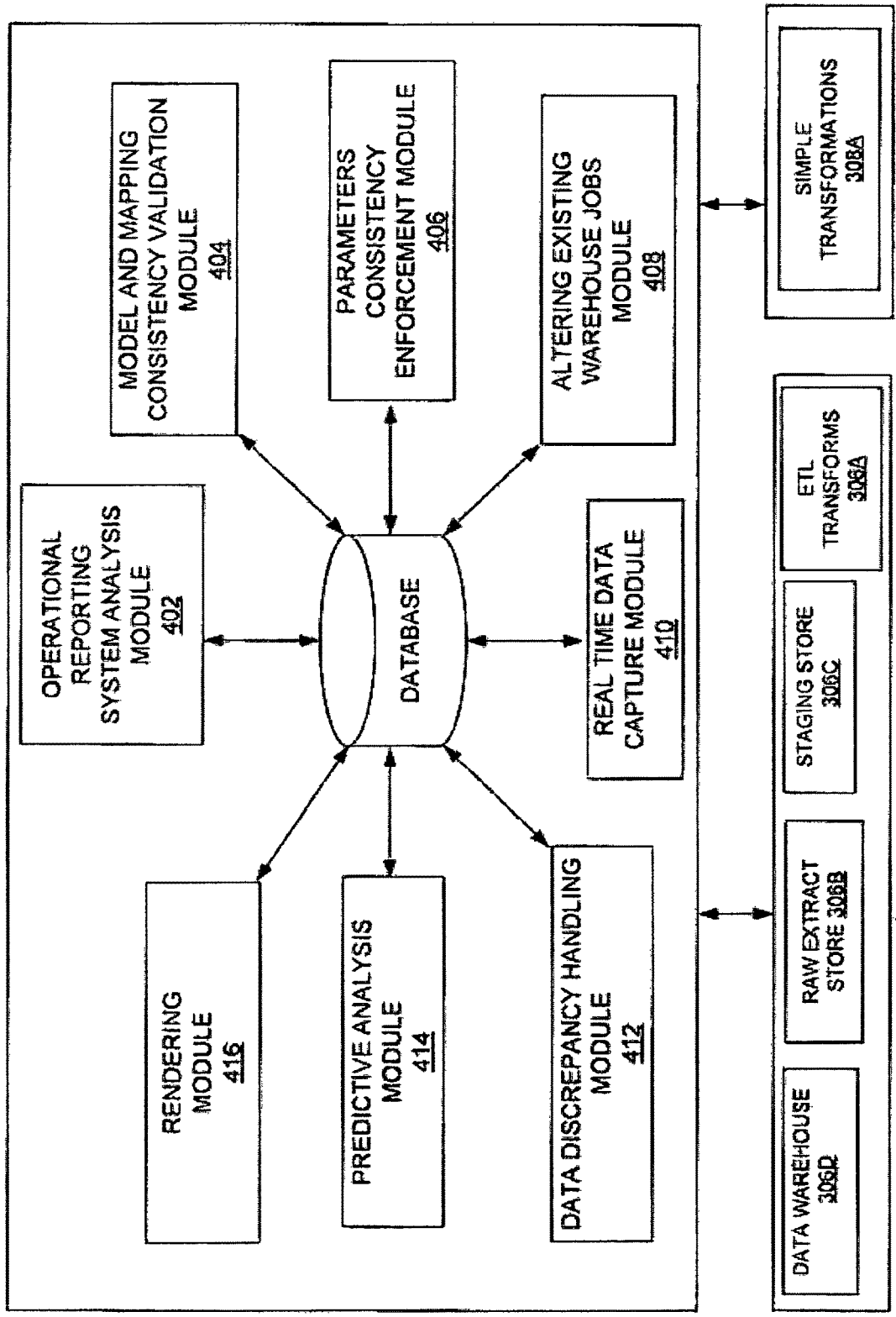
FIG. 4 illustrates an exploded view of the integrated system of FIG. 3 according to an embodiment of the invention.

FIG. 4 illustrates an exploded view of the integrated system 310 of FIG. 3 according to an embodiment of the invention. The integrated system 310 shown in FIG. 4 includes an operational reporting system analysis module 402, a model and mapping consistency validation module 404, a parameters consistency enforcement module 406, an altering existing warehouse jobs module 408, a real time data capture module 410, a data discrepancy handling module 412, a predictive analysis module 414, and a rendering module 416. The operational reporting system analysis module 402 queries the operational reporting system 308 for model and mapping information extraction. The model and mapping consistency validation module 404 automatically enforces consistency between a data model of the operational reporting system 308 and a dimensional data model of the warehouse based reporting system 306 by aligning the dimensional data model of the warehouse based reporting system 306 with the data model of the operational reporting system 308 using software aids. The software aids rely on both the operational reporting system 308 and the warehouse based reporting system 306 tracking model definitions and mappings in metadata, linked using lineage capabilities, with the ability to programmatically query the model and mappings from the operational reporting system 308 and the warehouse based reporting system 306 for comparison. The parameters consistency enforcement module 406 automatically ensures consistency of extraction methods, timestamping, timezones and collations across the operational reporting system 308 and the warehouse based reporting system 306 when populating data per a common or consistent dimensional model 310A. The altering existing warehouse jobs module 408 code generates modified jobs for near real time or real time data access for a subset of warehouse tables while ensuring logically related group of tables are updated together to avoid any inconsistencies with selective updating and it also tracks dropped transforms which may cause potential data discrepancies.

Real time data capture module 410 captures source data changes in real time for the operational reporting system 308. Data discrepancy handling module 412 automatically detects one or more data discrepancies between same metrics in the operational reporting system 308 and the warehouse based reporting system 306 due to (a) different data refresh times of the operational reporting system 308 and the warehouse based reporting system 306, and (b) skipping data quality correction of the operational reporting system 308 for efficiency. Data discrepancy handling module 412 automatically identifies relevant trends from the data discrepancies by comparing metric values of the operational reporting system 308 with current and historical values of the same metrics in the warehousing based reporting system 306. Data discrepancy handling module 412 automatically generates alerts when the data discrepancies exceed a predefined value or an auto identified threshold value. Data discrepancy handling module 412 automatically eliminates the data discrepancies caused due to data staleness by identifying tables, including any logically connected tables, based on which the metrics are computed and selectively refreshing the logical group of connected tables using code generated incremental refresh jobs. Data discrepancy handling module 412 automatically eliminates data discrepancies caused due to skipped data quality transforms by incorporating the data quality transforms for the operational reporting system 308.

Predictive analysis module 414 automatically enables predictions for real time content based on the common or consistent dimensional model 310A that links the real time content of the operational reporting system 308 with historical content and predictive models of the warehouse based reporting system 306. Rendering module 416 automatically analyzes real time content provided by the operational reporting system 308 with historical content and cross subject perspective provided by the warehouse based reporting system 306.

Figure 5:
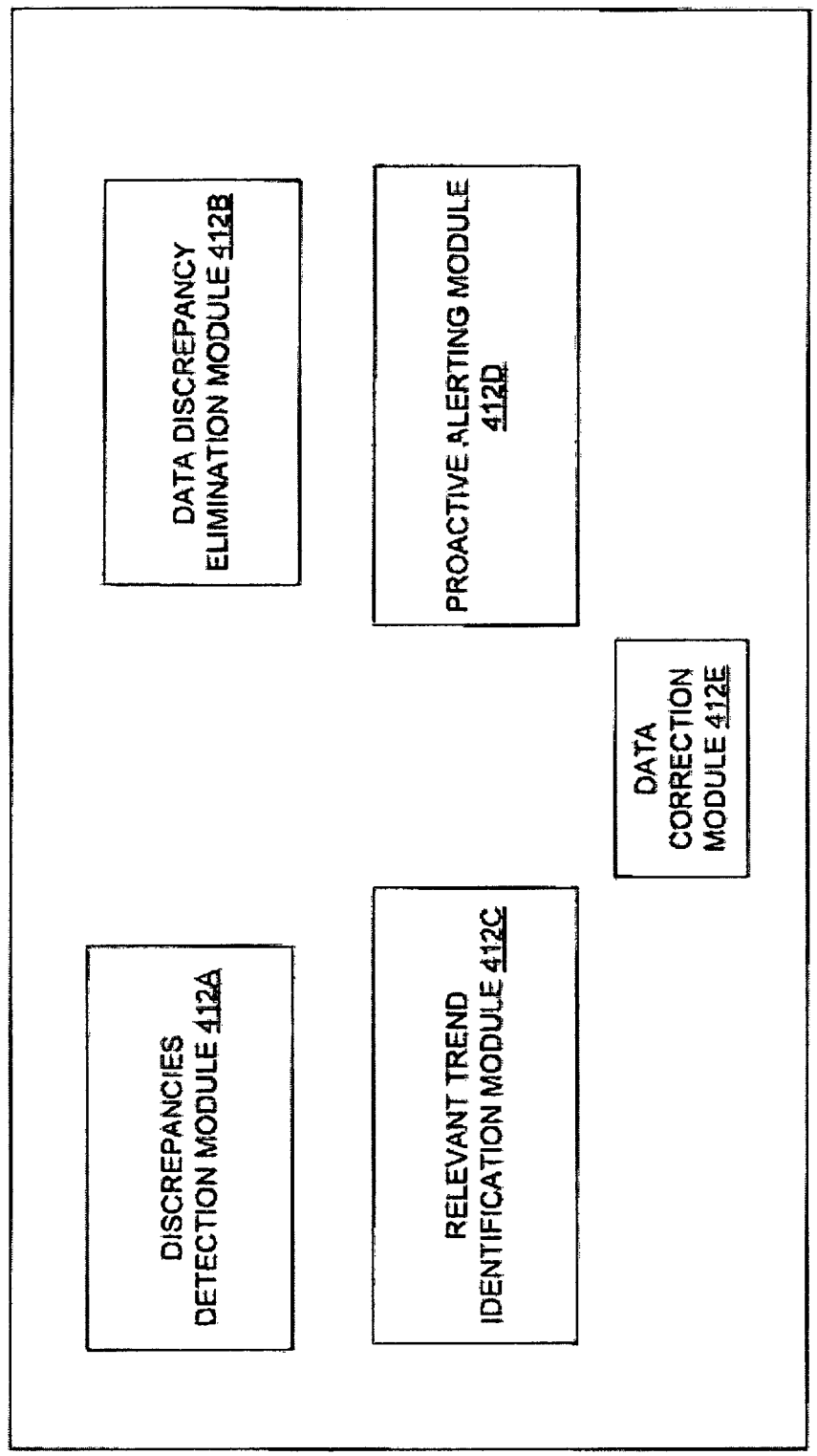
FIG. 5 illustrates an exploded view of a data discrepancy handling module of FIG. 4 according to an embodiment of the invention.

FIG. 5 illustrates an exploded view of the data discrepancy handling module 412 of FIG. 4 according to an embodiment of the invention. Data discrepancy handling module 412 shown in FIG. 5 includes a data discrepancy detection module 412A, a data discrepancy elimination module 412B, a relevant trend identification module 412C, and a proactive alerting module 412D. Data discrepancy detection module 412A automatically detects one or more data discrepancies between same metrics in the operational reporting system 308 and the warehouse based reporting system 306 due to (a) different data refresh times of the operational reporting system 308 and the warehouse based reporting system 306, and (b) skipping data quality correction of the operational reporting system 308 for efficiency.

Data discrepancy elimination module 412B eliminates data discrepancies caused due to data staleness by identifying tables, including logically connected tables if any, based on which metrics are computed, and selectively refreshing the logical group of connected tables, using code generated incremental refresh jobs. Relevant trend identification module 412C identifies relevant trends from the data discrepancies by comparing metric values of the operational reporting system 308 with current and historical values of the same metrics in the warehouse based reporting system 306. Proactive alerting module 412D generates alerts when data discrepancies exceed a predefined value, or an auto identified threshold value. Data discrepancy handling module 412 may further include a data correction module 412E that automatically eliminates data discrepancies caused due to skipped data quality transforms by incorporating the data quality transforms for the operational reporting system 308. For trend analysis, differences between current versions in the warehouse based reporting system 306 and the operational reporting system 308, as well as differences between the historical (non latest) values of the warehouse based reporting system 306 against a current value of operational reporting system 308 are significant, but of course only the current version of the warehouse metrics get updated with the data discrepancy elimination module 412B.

With reference to FIG. 3 to FIG. 5, FIG. 6 illustrates an exploded view of the integrated system 310 of FIG. 3 that integrates the warehouse based reporting system 306, and the operational reporting system 308 which is supported by a warehouse vendor using a common dimensional data model and common data processing infrastructure according to an embodiment of the invention. The integrated system 310 includes the altering existing warehouse jobs module 408, the real time data capture module 410, the data discrepancy detection module 412A, the data discrepancy elimination module 412B, the relevant trend identification module 412C, the proactive alerting module 412D, the data correction module 412E, the rendering module 416 and the predictive analysis module 414. The altering existing warehouse jobs module 408 automatically ensures that modified jobs are generated for near real time data access and real time data access for a subset of warehouse tables while (i) ensuring logically related group of warehouse tables are updated together to avoid any inconsistencies with selective updating and (ii) tracking dropped transforms which may cause potential data discrepancies. The real time data capture module 410 captures source data changes in real time for the operational reporting system 308. The rendering module 416 automatically analyzes real time content provided by the operational reporting system 308 with historical content and cross subject perspective provided by the warehouse based reporting system 306. The predictive analysis module 414 automatically enables predictions for the real time content based on a common or consistent dimensional model 310A that links the real time content of the operational reporting system 308 with historical content and predictive models of the warehouse based reporting system 306. The data discrepancy detection module 412A automatically detects one or more data discrepancies between metrics in the operational reporting system 308 and the warehouse based reporting system 306 due to (a) different data refresh times of the operational reporting system 308 and the warehouse based reporting system 306, and (b) skipping data quality correction of the operational reporting system 308 for efficiency. The relevant trend identification module 412C automatically identifies relevant trends from the data discrepancies by comparing metric values of the operational reporting system 308 with current and historical values of the same metrics in the warehouse based reporting system 306. The proactive alerting module 412D automatically generates alerts when the data discrepancies exceed a predefined value, or an auto identified threshold value. The data discrepancy elimination module 412B automatically eliminates the data discrepancies caused due to data staleness by identifying tables, including logically connected tables if any, based on which the metrics are computed and selectively refreshing the logical group of connected tables, using code generated incremental refresh jobs. The data correction module 412E automatically eliminates data discrepancies caused due to skipped data quality transforms by incorporating the data quality transforms for the operational reporting system 308.

With reference to FIG. 3 to FIG. 5, FIG. 7 illustrates an exploded view of the integrated system 310 of FIG. 3 that integrates the warehouse based reporting system 306, and the operational reporting system 308 that is supported by a warehouse vendor using a common dimensional data model and separate data processing infrastructure according to an embodiment herein. The integrated system 310 includes the altering existing warehouse jobs module 408, the parameters consistency enforcement module 406, the real time data capture module 410, the data discrepancy detection module 412A, the data discrepancy elimination module 412B, the relevant trend identification module 412C, the proactive alerting module 412D, the data correction module 412E, the rendering module 416 and the predictive analysis module 414. The altering existing warehouse jobs module 408 automatically ensures that modified jobs are generated for near real time data access and real time data access for a subset of warehouse tables while (i) ensuring logically related group of warehouse tables are updated together to avoid any inconsistencies with selective updating and (ii) tracking dropped transforms which may cause potential data discrepancies. The parameters consistency enforcement module 406 automatically ensures consistency of extraction methods, timestamping, timezones and collations across the operational reporting system 308 and the warehouse based reporting system 306 when populating data per a common or consistent dimensional model 310A. The real time data capture 410 module captures data in real time in a warehouse vendor supporting the warehouse based reporting system 306. The rendering module 416 automatically analyzes real time content provided by the operational reporting system 308 with historical content and cross subject perspective provided by the warehouse based reporting system 306. The predictive analysis module 414 automatically enables predictions for the real time content based on the common or consistent dimensional model 310A that links the real time content of the operational reporting system 308 with historical content and predictive models of the warehouse based reporting system 306. The data discrepancy detection module 412A automatically detects one or more data discrepancies between metrics in the operational reporting system 308 and the warehouse based reporting system 306 due to (a) different data refresh times of the operational reporting system 308 and the warehouse based reporting system 306, and (b) skipping data quality correction of the operational reporting system 308 for efficiency. The relevant trend identification module 412C automatically identifies relevant trends from the data discrepancies by comparing metric values of the operational reporting system 308 with current and historical values of the same metrics of the warehouse based reporting system 306. The proactive alerting module 412D automatically generates alerts when the data discrepancies exceed a predefined value, or an auto identified threshold value. The data discrepancy elimination module 412B automatically eliminates the data discrepancies caused due to data staleness by identifying tables, including logically connected tables if any, based on which the metrics are computed and selectively refreshing the logical group of connected tables, using code generated incremental refresh jobs. The data correction module 412E automatically eliminates data discrepancies caused due to skipped data quality transforms by incorporating the data quality transforms for the operational reporting system 308.

With reference to FIG. 3 to FIG. 5, FIG. 8 illustrates an exploded view of the integrated system 310 of FIG. 3 that integrates the warehouse based reporting system 306, and the operational reporting system 308 that are supported by two separate vendors using a common dimensional model and separate data processing infrastructure according to an embodiment of the invention. The integrated system 310 includes the operational reporting system analysis module 402, the model and mapping consistency validation module 404, the parameters consistency enforcement module 406, the data discrepancy detection module 412A, the data discrepancy elimination module 412B, the relevant trend identification module 412C, the proactive alerting module 412D, the data correction module 412E, the rendering module 416 and the predictive analysis module 414. The operational reporting system analysis module 402 queries the operational reporting system 308 for model and mapping information extraction. The model and mapping consistency validation module 404 automatically enforces consistency between a data model of the operational reporting system 308 and a dimensional data model of the warehouse based reporting system 306 by aligning the dimensional data model of the warehouse based reporting system 306 with the data model of the operational reporting system 308 using software aids. The parameters consistency enforcement module 406 automatically ensures consistency of extraction methods, timestamping, timezones and collations across the operational reporting system 308 and the warehouse based reporting system 306 when populating data per a common or consistent dimensional model 310A. The rendering module 416 automatically analyzes real time content provided by the operational reporting system 308 with historical content and cross subject perspective provided by the warehouse based reporting system 306. The predictive analysis module 414 automatically enables predictions for the real time content based on the common or consistent dimensional model 310A that links the real time content of the operational reporting system 308 with historical content and predictive models of the warehouse based reporting system 306. The data discrepancy detection module 412A automatically detects one or more data discrepancies between metrics in the operational reporting system 308 and the warehouse based reporting system 306 due to (a) different data refresh times of the operational reporting system 308 and the warehouse based reporting system 306, and (b) skipping data quality correction of the operational reporting system 308 for efficiency. The relevant trend identification module 412C automatically identifies relevant trends from the data discrepancies by comparing metric values of the operational reporting system 308 with current and historical values of the same metrics in the warehouse based reporting system 306. In one embodiment, the relevant trends may be displayed using standard business intelligence charts. The proactive alerting module 412D automatically generates alerts when the data discrepancies exceed a predefined value, or an auto identified threshold value. The data discrepancy elimination module 412B automatically eliminates the data discrepancies caused due to data staleness by identifying tables, including logically connected tables if any, based on which the metrics are computed and selectively refreshing the logical group of connected tables, using code generated incremental refresh jobs. The data correction module 412E automatic eliminates data discrepancies caused due to skipped data quality transforms by incorporating the data quality transforms for the operational reporting system 308.

Figure 8:
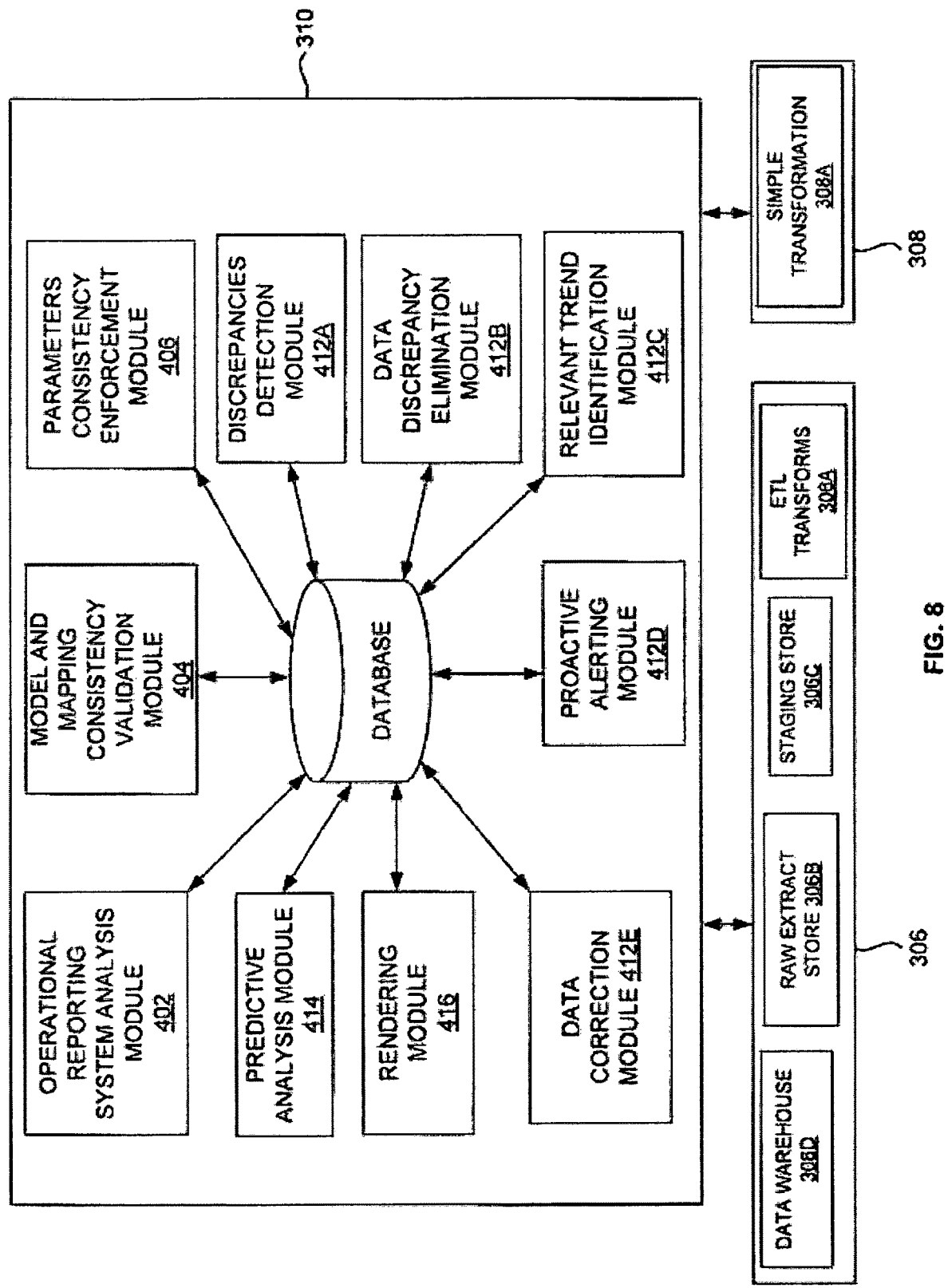
FIG. 8 illustrates an exploded view of the integrated system of FIG. 3 that integrates the warehouse based reporting system, and the operational reporting system that are supported by two different vendors using a common dimensional model and separate data processing infrastructure according to an embodiment of the invention.
Figure 9:
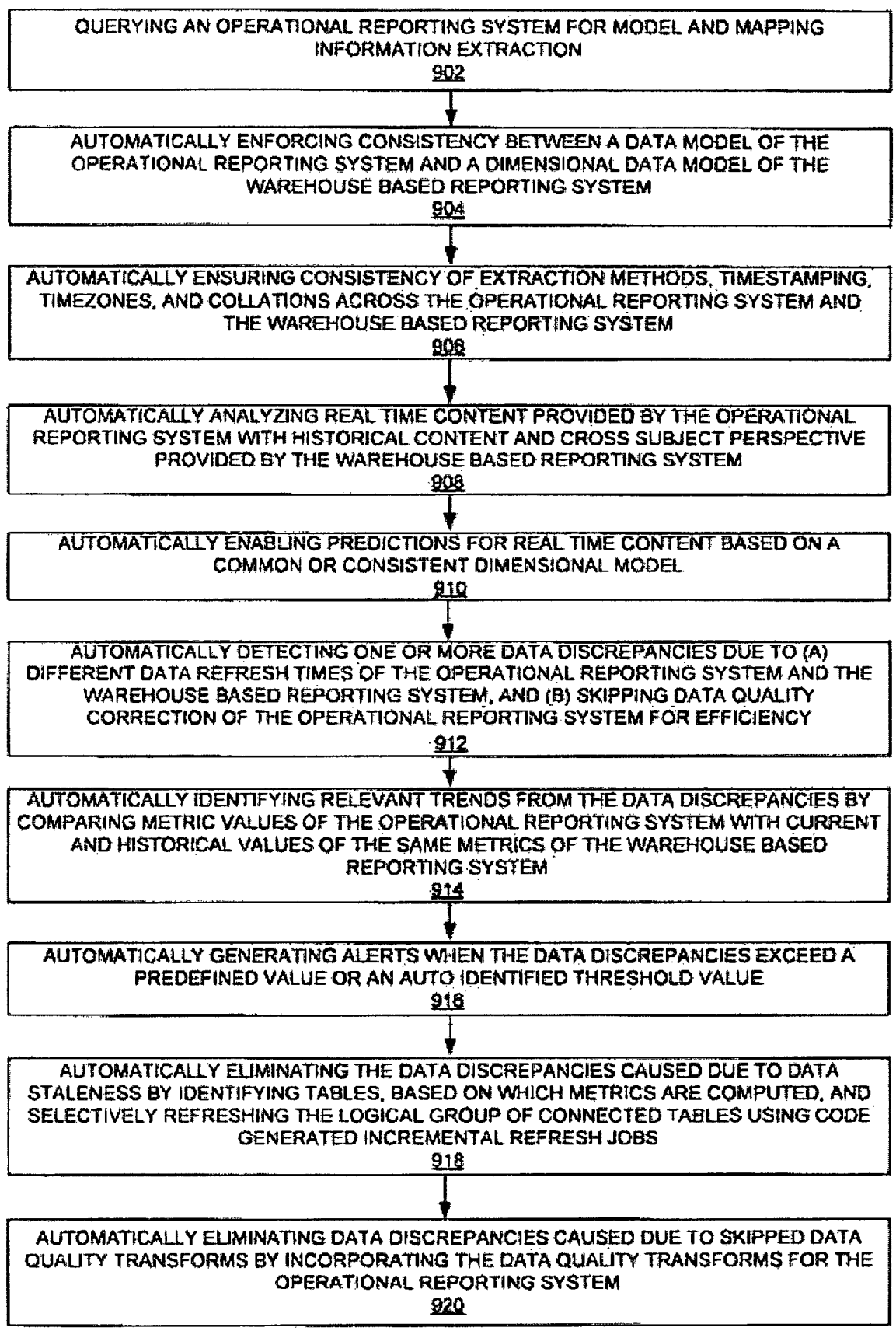
FIG. 9 is a flow diagram illustrating automatic integration of the operational reporting system and the warehouse based reporting system that are supported by two different vendors using a common dimensional model and separate data processing infrastructure according to an embodiment of the invention.

With reference to FIG. 8, FIG. 9 is a flow diagram illustrating automatic integration of the operational reporting system 308 and the warehouse based reporting system 306 that are supported by two separate vendors using a common dimensional model and separate data processing infrastructure according to an embodiment of the invention. At step 902, the operational reporting system 308 is queried for model and mapping information extraction. At step 904, consistency between the data model of the operational reporting system 308 and the dimensional data model of the warehouse based reporting system 306 is automatically enforced by aligning the dimensional data model of the warehouse based reporting system 306 with the data model of the operational reporting system 308 using software aids. At step 906, consistency of extraction methods, timestamping, timezones and collations is automatically ensured across the operational reporting system 308 and the warehouse based reporting system 306 when populating data per a common or consistent dimensional model 310A. At step 908, real time content provided by the operational reporting system 308 with historical content and cross subject perspective provided by the warehouse based reporting system 306 are automatically analyzed. At step 910, predictions for real time content are automatically enabled based on the common or consistent dimensional model 310A that links real time content of the operational reporting system 308 with historical content and predictive models of the warehouse based reporting system 306.

At step 912, one or more data discrepancies are automatically detected due to (a) different data refresh times of the operational reporting system 308 and the warehouse based reporting system 306, and (b) skipping data quality correction of the operational reporting system 308 for efficiency. At step 914, relevant trends from data discrepancies are automatically identified by comparing metric values of the operational reporting system 308 with current and historical values of the same metrics in the warehouse based reporting system 306. At step 916, alerts are automatically generated when data discrepancies exceed a predefined value, or an auto identified threshold value. At step 918, data discrepancies caused due to data staleness are automatically eliminated by identifying tables, including logically connected tables if any, based on which metrics are computed, and selectively refreshing the logical group of connected tables using code generated incremental refresh jobs. At step 920, data discrepancies caused due to skipped data quality transforms are automatically eliminated by incorporating the data quality transforms for the operational reporting system 308.

Figure 6:
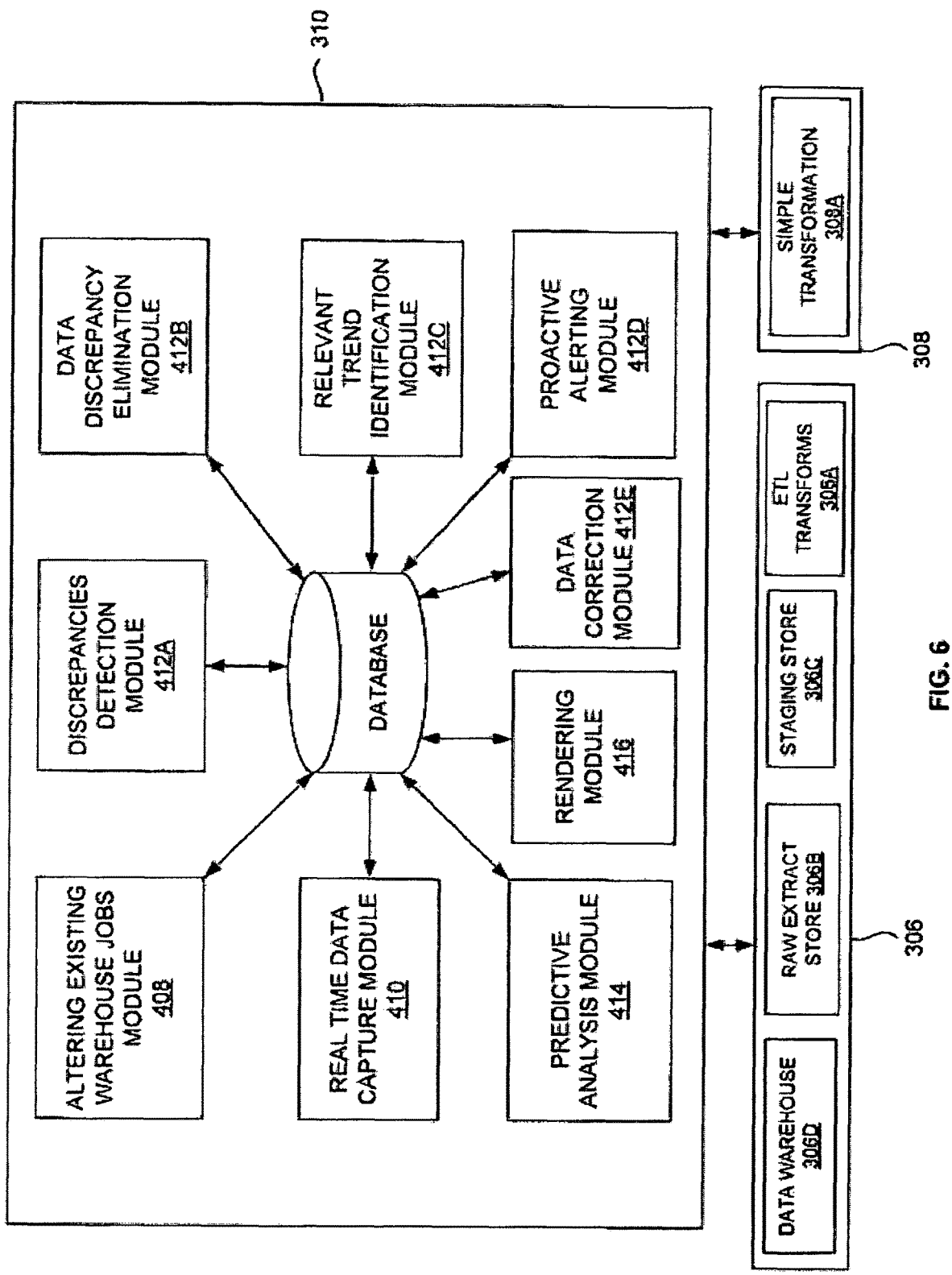
FIG. 6 illustrates an exploded view of the integrated system of FIG. 3 that integrates the warehouse based reporting system, and the operational reporting system which is supported by a warehouse vendor using a common dimensional data model and common data processing infrastructure according to an embodiment of the invention.
Figure 10:
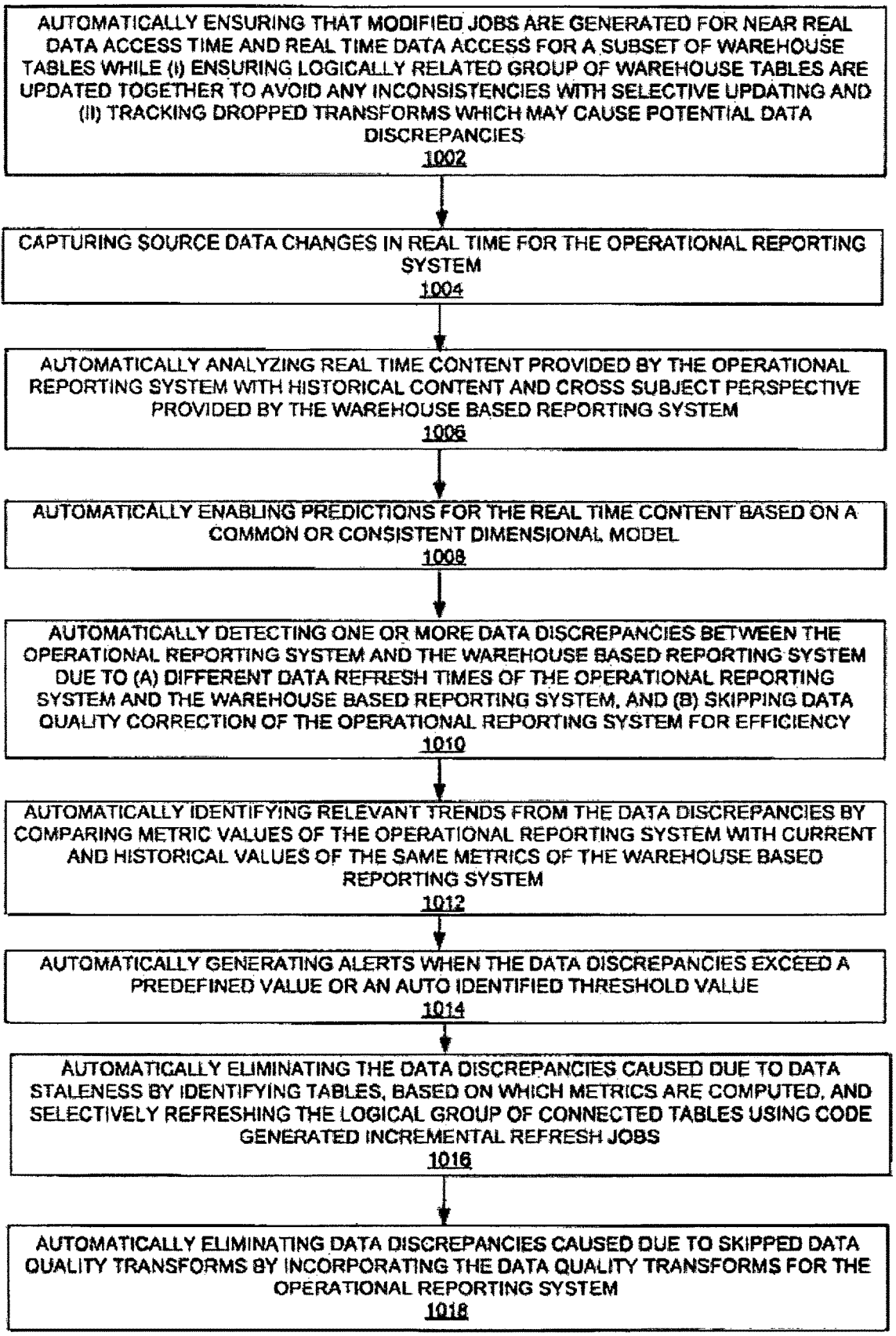
FIG. 10 is a flow diagram illustrating automatic integration of the warehouse based reporting system, and the operational reporting system that is supported by a warehouse vendor using a common dimensional data model and common data processing infrastructure according to an embodiment of the invention.

With reference to FIG. 6, FIG. 10 is a flow diagram illustrating automatic integration of the warehouse based reporting system 306, and the operational reporting system 308 that is supported by a warehouse vendor using a common dimensional data model and common data processing infrastructure according to an embodiment of the invention. At step 1002, modified jobs are generated for near real time data access and real time data access for a subset of warehouse tables, while (i) ensuring logically related group of warehouse tables are updated together to avoid any inconsistencies with selective updating and (ii) tracking dropped transforms which may cause potential data discrepancies. At step 1004, source data changes are captured in real time for the operational reporting system 308. At step 1006, real time content provided by the operational reporting system 308 with historical content and cross subject perspective provided by the warehouse based reporting system 306 are automatically analyzed. At step 1008, predictions for the real time content are automatically enabled based on a common or consistent dimensional model 310A that links real time content of the operational reporting system 308 with historical content and predictive models of the warehouse based reporting system 306. At step 1010, one or more data discrepancies are automatically detected due to (a) different data refresh times of the operational reporting system 308 and the warehouse based reporting system 306, and (b) skipping data quality correction of the operational reporting system 308 for efficiency. At step 1012, relevant trends from data discrepancies are automatically identified by comparing metric values of the operational reporting system 308 with current and historical values of the same metrics in the warehouse based reporting system 306. At step 1014, data discrepancies caused due to data staleness are automatically eliminated by identifying tables, including logically connected tables if any, based on which metrics are computed, and selectively refreshing the logical group of connected tables using code generated incremental refresh jobs. At step 1016, alerts are automatically generated when data discrepancies exceed a predefined value, or an auto identified threshold value. At step 1018, data discrepancies caused due to skipped data quality transforms are automatically eliminated by incorporating the data quality transforms for the operational reporting system 308.

Figure 7:
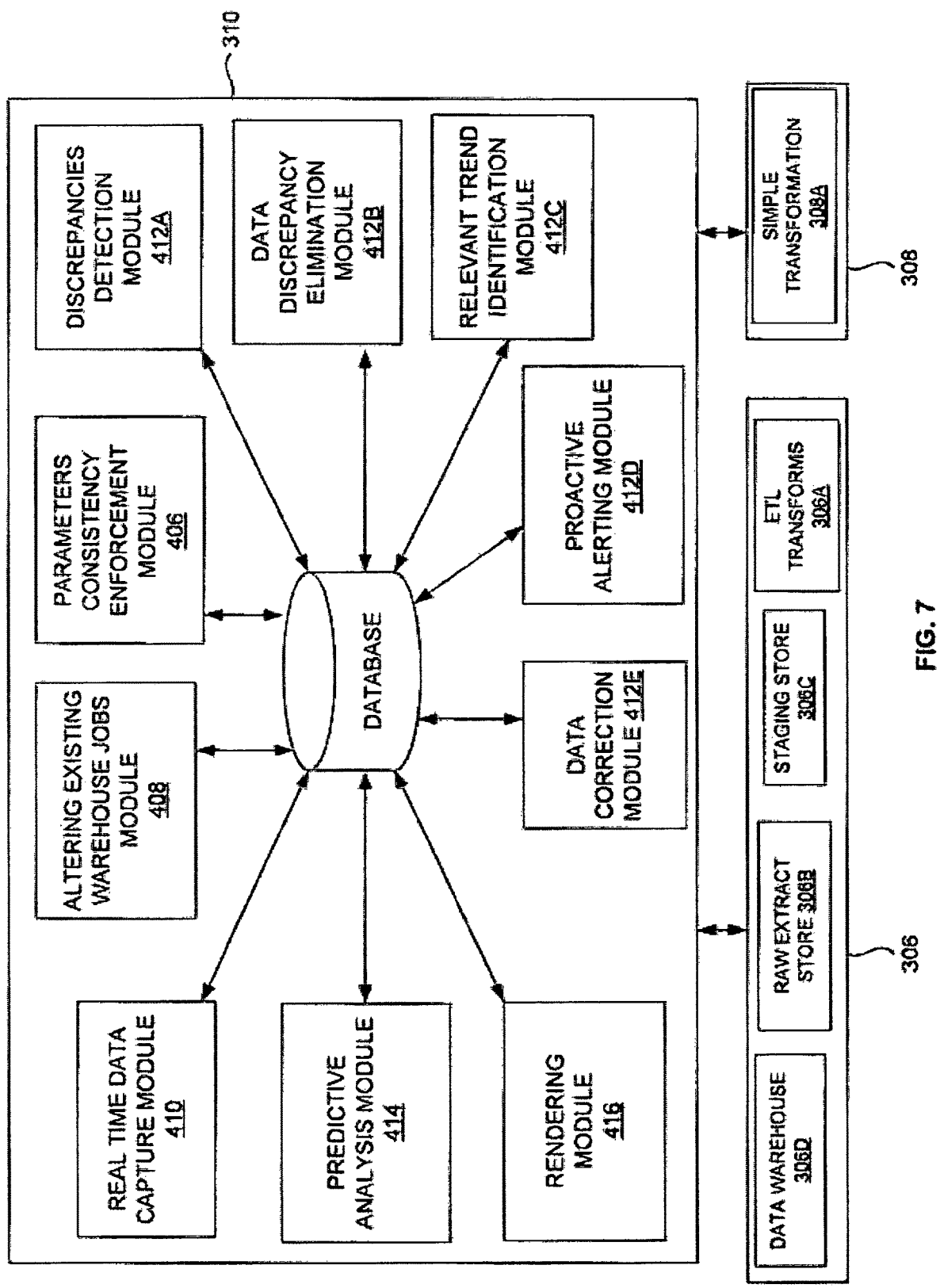
FIG. 7 illustrates an exploded view of the integrated system of FIG. 3 that integrates the warehouse based reporting system, and the operational reporting system that is supported by a warehouse vendor using a common dimensional data model and separate data processing infrastructure of according to an embodiment of the invention.
Figure 11:
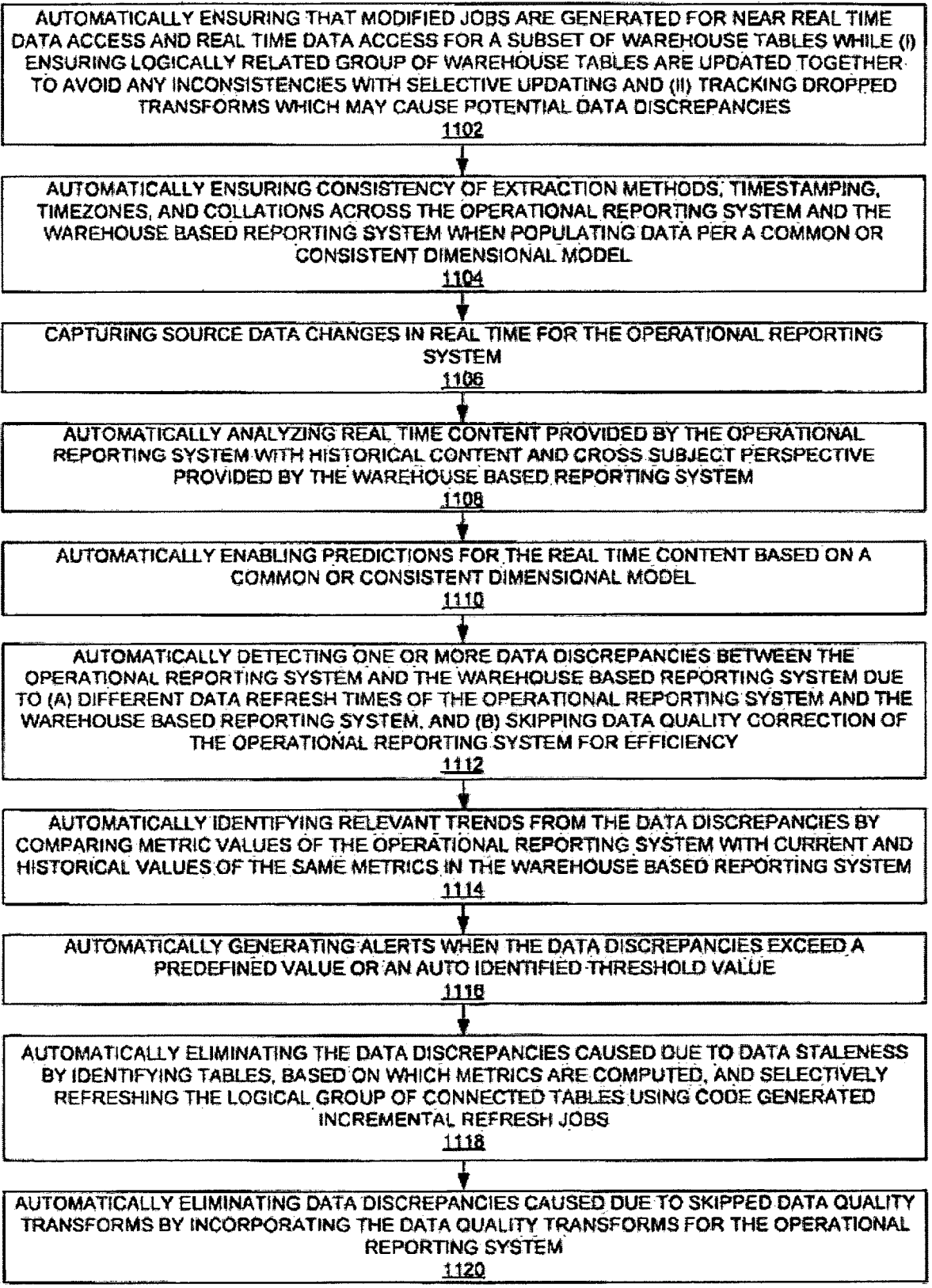
FIG. 11 is a flow diagram illustrating automatic integration of the warehouse based reporting system and the operational reporting system that is supported by the warehouse vendor using a common dimensional data model and separate data processing infrastructure according to an embodiment of the invention.

With reference to FIG. 7, FIG. 11 is a flow diagram illustrating automatic integration of the warehouse based reporting system 306 and the operational reporting system 308 that is supported by the warehouse vendor using a common dimensional data model and separate data processing infrastructure according to an embodiment of the invention. At step 1102, modified jobs are generated for near real time data access and real time data access for a subset of warehouse tables, while (i) ensuring logically related group of warehouse tables are updated together to avoid any inconsistencies with selective updating and (ii) tracking dropped transforms which may cause potential data discrepancies. At step 1104, consistency of extraction methods, timestamping, timezones and collations across the operational reporting system 308 and the warehouse based reporting system 306 is automatically ensured when populating data per a common or consistent dimensional model. At step 1106, source data changes are captured in real time for the operational reporting system 308. At step 1108, real time content provided by the operational reporting system 308 with historical content and cross subject perspective provided by the warehouse based reporting system 306 are automatically analyzed. At step 1110, predictions for the real time content are automatically enabled based on the common or consistent dimensional model 310A that links real time content of the operational reporting system 308 with historical content and predictive models of the warehouse based reporting system 306. At step 1112, one or more data discrepancies are automatically detected due to (a) different data refresh times of the operational reporting system 308 and the warehouse based reporting system 306, and (b) skipping data quality correction of the operational reporting system 308 for efficiency. At step 1114, relevant trends from data discrepancies are automatically identified by comparing metric values of the operational reporting system 308 with current and historical values of the same metrics in the warehouse based reporting system 306. At step 1116, alerts are automatically generated when data discrepancies exceed a predefined value, or an auto identified threshold value. At step 1118, the data discrepancies caused due to data staleness are automatically eliminated by identifying tables, including logically connected tables if any, based on which metrics are computed, and selectively refreshing the logical group of connected tables using code generated incremental refresh jobs. At step 1120, data discrepancies caused due to skipped data quality transforms are automatically eliminated by incorporating the data quality transforms for the operational reporting system 308.

Figure 12:
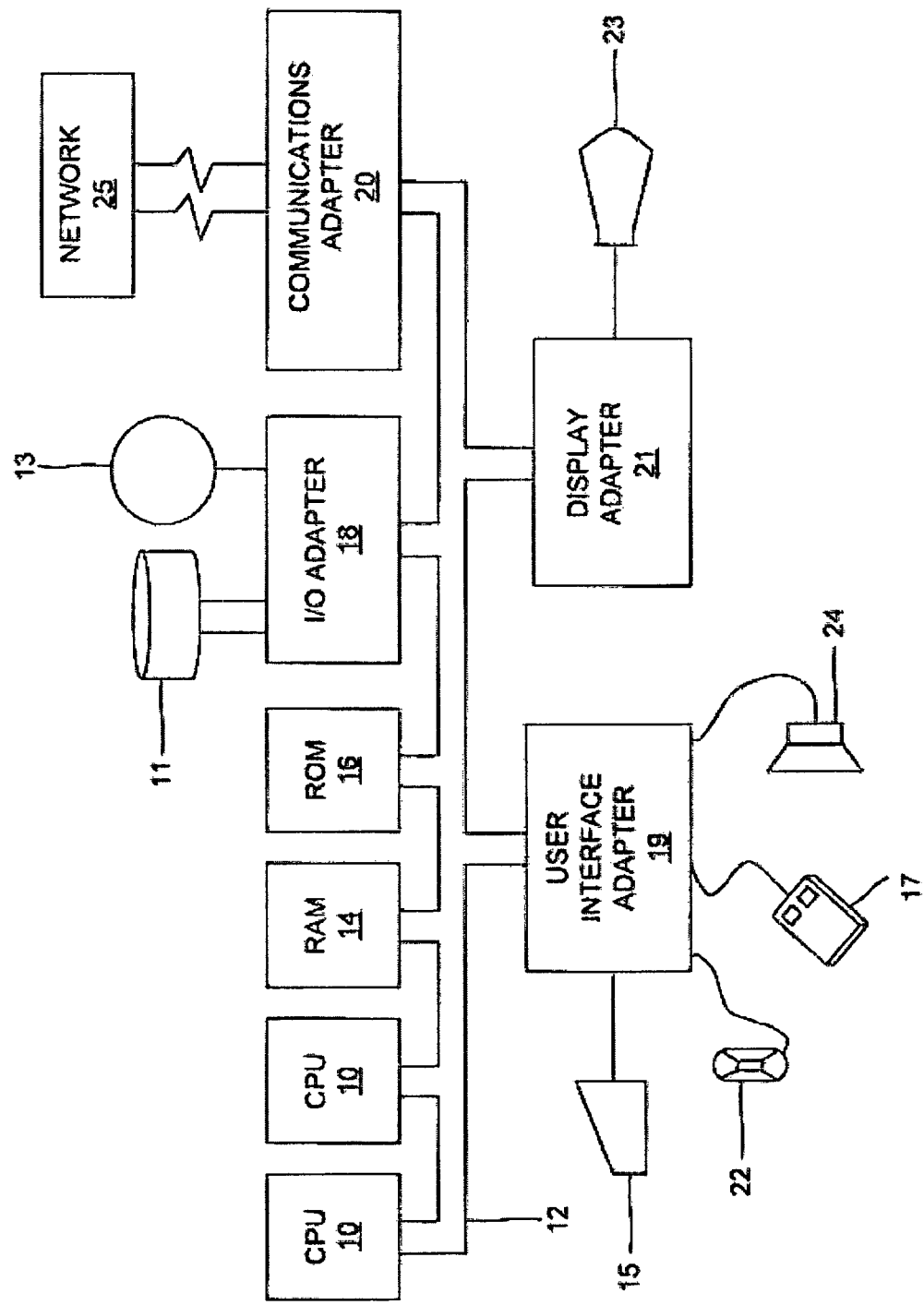
FIG. 12 is a computer system which may be employed according to an embodiment of the invention.

FIG. 12, with reference to FIGS. 3 through 11, is an integrated system (e.g. the integrated system 310) used in accordance with certain embodiments discussed herein. The integrated system may include one or more of a personal computer, a laptop, a tablet device, a smartphone, a mobile communication device, a personal digital assistant, or any other such computing device, in one example embodiment, in another example embodiment. This schematic drawing illustrates a hardware configuration of the integrated system/computer system in accordance with the embodiments herein. The integrated system includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communications adapter 20 connects the bus 12 to a data processing network 25, and a display adapter 21 connects the bus 12 to a display device 23 which may be embodied as an output device such as a monitor, printer, or transmitter, for example.

Having the operational reporting system 308 coexist side by side with the warehouse based reporting system 306 in the same interface using the common dimensional model 310A enables real time operational reports to be evaluated with historical and cross subject perspective and makes ad-hoc real time analysis easier. Having the common dimensional model 310A facilitates dimensional analysis in real time operational reports including predictions based on predictive models created using historical warehouse based data. Automated detection of significant changes to measures in real time over historical values allows for trend identification, proactive alerting and possible root cause problem analysis in real time. Selective refresh of a logical group of connected tables in an automated fashion using code generated ETL jobs and incremental refresh for efficiency, allows for quick reconciliation.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes automatic integration of an operational reporting system and a warehouse based reporting system that are supported by two separate vendors using a common dimensional model and separate data processing infrastructure, by performing the steps of:
   querying said operational reporting system for model and mapping information extraction;
   automatically enforcing consistency between a data model of said operational reporting system and a dimensional data model of said warehouse based reporting system by aligning said dimensional data model of said warehouse based reporting system with said data model of said operational reporting system using software aids, wherein said software aids query said dimensional data model of said warehouse based reporting system and said data model of said operational reporting system for model definitions and mappings of metrics to source elements tracked using lineage capabilities to identify equivalent model elements for model alignment by comparison of their definitions;
   automatically ensuring consistency of (i) data extraction methods between said operational reporting system and said warehouse based reporting system, (ii) timestamping, and timezones of data associated with said operational reporting system and said warehouse based reporting system, and (iii) collations across said operational reporting system and said warehouse based reporting system, upon determining that populating the data in a common or consistent dimensional model occurs;
   automatically analyzing real time content provided by said operational reporting system with historical content and cross subject perspective provided by said warehouse based reporting system; and
   automatically enabling predictions for said real time content based on said common or consistent dimensional model that links said real time content of said operational reporting system with historical content and predictive models of said warehouse based reporting system.

2. The one or more non-transitory computer readable storage mediums storing one or more sequences of instructions of claim 1, which when executed by one or more processors further causes:
   automatic detection of one or more data discrepancies, between same metrics of said operational reporting system and said warehouse based reporting system, caused due to (a) different data refresh times of the data associated with said operational reporting system and said warehouse based reporting system, and (b) skipping data quality correction on the data associated with said operational reporting system for efficiency;
   automatic elimination of said data discrepancies caused due to different data refresh times by identifying using lineage, tables including logically connected tables, based on which said metrics are computed, and incrementally refreshing the said tables using code generated incremental refresh jobs to have the same data in both said operational reporting system and said warehouse based reporting system; and
   automatic elimination of said data discrepancies caused due to skipped data quality transforms by incorporating said data quality transforms for said operational reporting system.

3. The one or more non-transitory computer readable storage mediums storing one or more sequences of instructions of claim 2, which when executed by one or more processors further causes:
   automatic identification of relevant trends from said data discrepancies by comparing metric values of said operational reporting system with current and historical values of same metrics in said warehouse based reporting system; and
   automatic generation of alerts upon determining that said data discrepancies exceed a predefined value, or an auto identified threshold value.

4. The one or more non-transitory computer readable storage mediums storing one or more sequences of instructions of claim 1, which when executed by one or more processors further causes displaying said relevant trends using business intelligence charts.

5. An integrated system that integrates a warehouse based reporting system with an operational reporting system using a common dimensional model, said integrated system comprising:
   a memory that stores a database and a first set of modules;
   a processor that executes said first set of modules, wherein said first set of modules comprises;
      a rendering module that automatically analyzes real time content provided by said operational reporting system with historical content and cross subject perspective provided by said warehouse based reporting system;
      a predictive analysis module that automatically enables predictions for said real time content based on said common or consistent dimensional model that links said real time content of said operational reporting system with historical content and predictive models of said warehouse based reporting system;
      a data discrepancy detection module that automatically detects one or more data discrepancies, between same metrics of said operational reporting system and said warehouse based reporting system, caused due to (a) different data refresh times of the data associated with said operational reporting system and said warehouse based reporting system, and (b) skipping data quality correction on the data associated with said operational reporting system for efficiency;
      a relevant trend identification module that automatically identifies relevant trends from said data discrepancies by comparing metric values of said operational reporting system with current and historical values of the same metrics in said warehouse based reporting system;
a proactive alerting module that automatically generates alerts upon determining that said data discrepancies exceed a predefined value, or an auto identified threshold value;
a data discrepancy elimination module that automatically eliminates said data discrepancies caused due to different data refresh times by identifying using lineage, tables including logically connected tables, based on which said metrics are computed, and incrementally refreshing the said tables, using code generated incremental refresh jobs to have the same data in both said operational reporting system and said warehouse based reporting system; and
a data correction module that automatically eliminates said data discrepancies caused due to skipped data quality transforms by incorporating said data quality transforms for said operational reporting system.

6. The integrated system as claimed in claim 5, wherein upon determining that said operational reporting system and said warehouse based reporting system are supported by two separate vendors using a common dimensional model and separate data processing infrastructure, said integrated system additionally comprises:
an operational reporting system analysis module that queries an operational reporting system for model and mapping information extraction; and
a model and mapping consistency validation module that automatically enforces consistency between a data model of said operational reporting system and a dimensional data model of said warehouse based reporting system by aligning said dimensional data model of said warehouse based reporting system with said data model of said operational reporting system using software aids, wherein said software aids query said dimensional data model of said warehouse based reporting system and said data model of said operational reporting system for model definitions and mappings of metrics to source elements tracked using lineage capabilities to identify equivalent model elements for model alignment by comparison of their definitions.

7. The integrated system as claimed in claim 5, wherein upon determining that (i) said operational reporting system is supported by a warehouse vendor using a common dimensional data model with separate data processing infrastructure, or (ii) said operational reporting system and said warehouse based reporting system are supported by two separate vendors using a common dimensional model and separate data processing infrastructure, said integrated system additionally comprises a parameters consistency enforcement module that automatically ensures consistency of (i) data extraction methods between said operational reporting system and said warehouse based reporting system, (ii) timestamping, and timezones of data associated with said operational reporting system and said warehouse based reporting system, and (iii) collations across said operational reporting system and said warehouse based reporting system upon determining that populating the data in a common or consistent dimensional model occurs.

8. The integrated system as claimed in claim 5, wherein upon determining that said operational reporting system is supported by a warehouse vendor using a common dimensional data model with a common or separate data processing infrastructure, said integrated system additionally comprises:
an altering existing warehouse jobs module that automatically ensures that modified jobs are generated for near real time data access and real time data access for a subset of warehouse tables upon determining that (i) ensuring logically related group of warehouse tables are updated together to avoid any inconsistencies with selective updating, and (ii) tracking dropped transforms which may cause potential data discrepancies; and
a real time data capture module for capturing source data changes in real time for said operational reporting system.

9. One or more non-transitory computer readable storage mediums storing one or more sequences of instructions, which when executed by one or more processors, causes automatic integration of a warehouse based reporting system, and an operational reporting system that is supported by a warehouse vendor using a common dimensional data model and common data processing infrastructure for said operational reporting system and said warehouse based reporting system, by performing the steps of:
automatically ensuring that modified jobs are generated for near real time data access and real time data access for a subset of warehouse tables upon determining that (i) ensuring logically related group of warehouse tables are updated together to avoid any inconsistencies with selective updating, and (ii) tracking dropped transforms which may cause potential data discrepancies;
automatically capturing source data changes in real time for said operational reporting system;
automatically analyzing real time content provided by said operational reporting system with historical content and cross subject perspective provided by said warehouse based reporting system;
automatically enabling predictions for said real time content based on a common or consistent dimensional model that links said real time content of said operational reporting system with historical content and predictive models of said warehouse based reporting system;
automatically detecting one or more data discrepancies between said operational reporting system and said warehouse based reporting system caused due to (a) different data refresh times of the data associated with said operational reporting system and said warehouse based reporting system, and (b) skipping data quality correction on the data associated with said operational reporting system for efficiency;
automatically identifying relevant trends from said data discrepancies by comparing metric values of said operational reporting system with current and historical values of the same metrics in said warehouse based reporting system;
automatically generating alerts upon determining that said data discrepancies exceed a predefined value, or an auto identified threshold value;
automatically eliminating said data discrepancies caused due to different data refresh times by identifying using lineage, tables including logically connected tables, based on which said metrics are computed and incrementally refreshing the said tables, using code generated incremental refresh jobs to have the same data in both said operational reporting system and said warehouse based reporting system; and automatically eliminating said data discrepancies caused due to skipped data quality transforms by incorporating said data quality transforms for said operational reporting system.

10. One or more non-transitory computer readable storage mediums storing one or more sequences of instructions, which when executed by one or more processors, causes automatic integration of a warehouse based reporting system and an operational reporting system that is supported by a warehouse vendor using a common dimensional data model and separate data processing infrastructure for said operational reporting system and said warehouse based reporting system, by performing the steps of:

automatically ensuring that modified jobs are generated for near real time data access and real time data access for a subset of warehouse tables upon determining that (i) ensuring logically related group of warehouse tables are updated together to avoid any inconsistencies with selective updating, and (ii) tracking dropped transforms which may cause potential data discrepancies;

automatically ensuring consistency of (i) data extraction methods between said operational reporting system and said warehouse based reporting system, (ii) timestamping, and timezones of data associated with said operational reporting system and said warehouse based reporting system, and (iii) collations across said operational reporting system and said warehousing based reporting system upon determining that populating the data in a common or consistent dimensional model occurs;

automatically capturing source data changes in real time for said operational reporting system;

automatically analyzing said real time content provided by said operational reporting system with historical content and cross subject perspective provided by said warehousing based reporting system;

automatically enabling predictions for real time content based on said common or consistent dimensional model that links said real time content of said operational reporting system with historical content and predictive models of said warehousing based reporting system;

automatically detecting one or more data discrepancies between said operational reporting system and said warehouse based reporting system caused due to (a) different data refresh times of the data associated with said operational reporting system and said warehouse based reporting system, and (b) skipping data quality correction on the data associated with said operational reporting system for efficiency;

automatically identifying relevant trends from said data discrepancies by comparing metric values of said operational reporting system with current and historical values of the same metrics in said warehousing based reporting system;

automatically generating alerts upon determining that said data discrepancies exceed a predefined value, or an auto identified threshold value;

automatically eliminating said data discrepancies caused due to different data refresh times by automatically identifying using lineage, tables including logically connected tables, based on which said metrics are computed, and incrementally refreshing the said tables, using code generated incremental refresh jobs to have the same data in both said operational reporting system and said warehouse based reporting system; and automatically eliminating said data discrepancies caused due to skipped data quality transforms by incorporating said data quality transforms for said operational reporting system.

\* \* \* \* \*